(12) United States Patent
Uda

(10) Patent No.: US 8,245,688 B2
(45) Date of Patent: Aug. 21, 2012

(54) INTAKE SYSTEM FOR INTERNAL COMBUSTION ENGINE

(75) Inventor: Toshiaki Uda, Aichi-ken (JP)

(73) Assignees: Toyota Jidosha Kabushiki Kaisha, Toyota-shi (JP); Denso Corporation, Kariya-Shi (JP)

( * ) Notice: Subject to any disclaimer, the term of this patent is extended or adjusted under 35 U.S.C. 154(b) by 317 days.

(21) Appl. No.: 12/635,778

(22) Filed: Dec. 11, 2009

(65) Prior Publication Data

US 2010/0147245 A1 Jun. 17, 2010

(30) Foreign Application Priority Data

Dec. 11, 2008 (JP) .................................. 2008-315733

(51) Int. Cl.
*F02B 31/00* (2006.01)
*F02M 35/10* (2006.01)
(52) U.S. Cl. .................... 123/306; 123/308; 123/184.56; 123/188.14
(58) Field of Classification Search .......... 123/306–308, 123/345–348, 435, 184.54–184.56, 184.48, 123/188.14; 701/103
See application file for complete search history.

(56) References Cited

U.S. PATENT DOCUMENTS

| | | | | |
|---|---|---|---|---|
| 4,577,602 A * | 3/1986 | Showalter | ..................... | 123/306 |
| 5,551,392 A * | 9/1996 | Yamaji et al. | ................. | 123/306 |
| 7,128,050 B1 | 10/2006 | Abe | | |
| 7,198,026 B2 * | 4/2007 | Masuta et al. | ................ | 123/308 |
| 7,958,863 B2 * | 6/2011 | Abe et al. | ...................... | 123/306 |
| 2005/0155570 A1 * | 7/2005 | Confer et al. | ................. | 123/306 |
| 2007/0044754 A1 * | 3/2007 | Peffley et al. | ................. | 123/306 |

FOREIGN PATENT DOCUMENTS

| | | |
|---|---|---|
| JP | 63-121879 U | 8/1988 |
| JP | 5-27259 U | 4/1993 |
| JP | 11201002 A | 7/1999 |
| JP | 2001248450 A | 9/2001 |
| JP | 2003262132 A | 9/2003 |
| JP | 2004293483 A | 10/2004 |
| JP | 2007-270667 A | 10/2007 |

OTHER PUBLICATIONS

Ofice Action issued Mar. 27, 2012 in corresponding Japanese Patent Appln No. 2008-315733 and partial English language translation thereof.

* cited by examiner

*Primary Examiner* — John T. Kwon
*Assistant Examiner* — Johnny Hoang
(74) *Attorney, Agent, or Firm* — Gifford, Krass, Sprinkle, Anderson & Citkowski, P.C.

(57) ABSTRACT

An intake system for an internal combustion engine includes a control unit that adjusts the opening amount of a TCV having a valve body and a valve shaft within a valve opening amount range between first and second opening amounts, and first and second rotation restriction portions that prevent the valve body from moving beyond first and second opening amount positions, respectively, by contacting the valve shaft. The valve body is divided into a short valve portion and a long valve portion located upstream of the short valve portion by the valve shaft. The length from the valve shaft to the tip is greater in the long valve portion than in the short valve portion. When the valve body is in the first or second opening position, the valve shaft is pushed against the first or second rotation restriction portion by intake air flowing through an intake pipe.

19 Claims, 6 Drawing Sheets

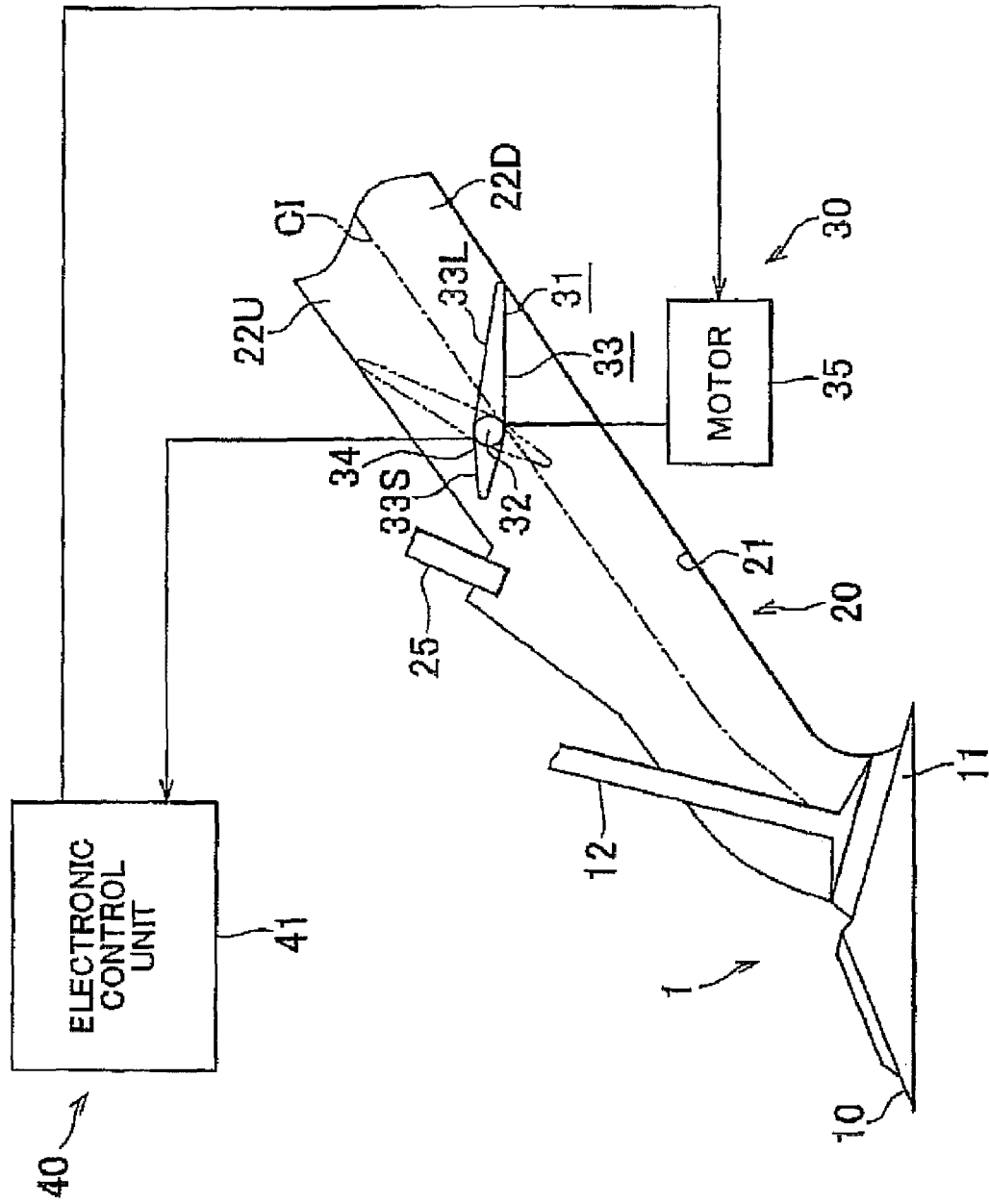

FIG. 2A
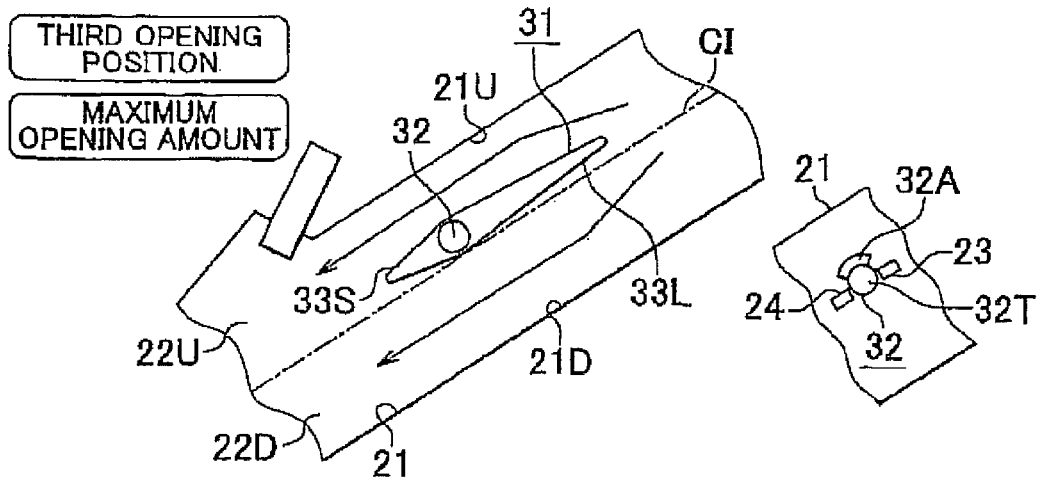
FIG. 2B
FIG. 2C
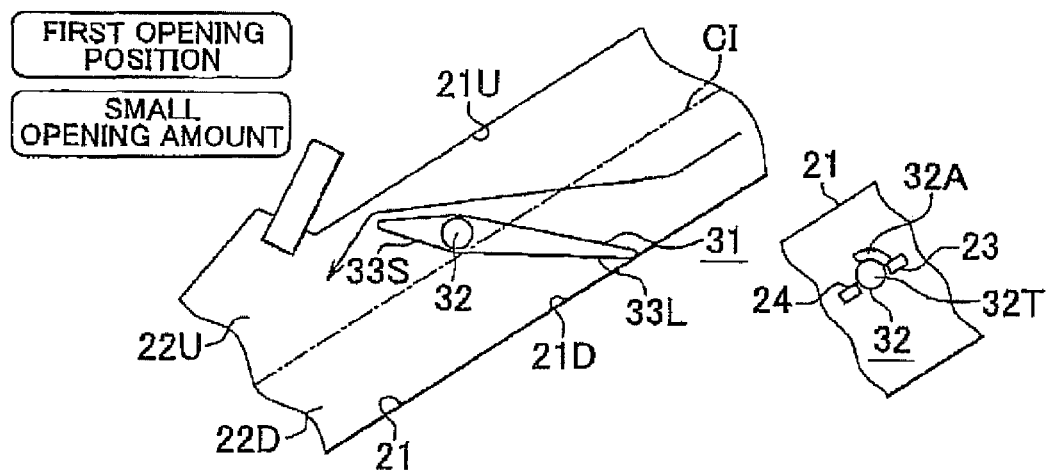
FIG. 2D
FIG. 2E
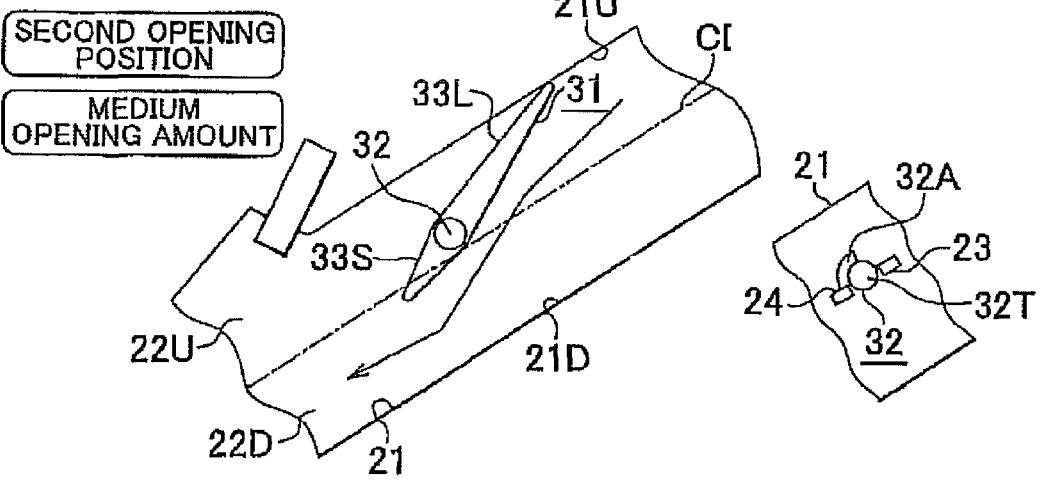
FIG. 2F

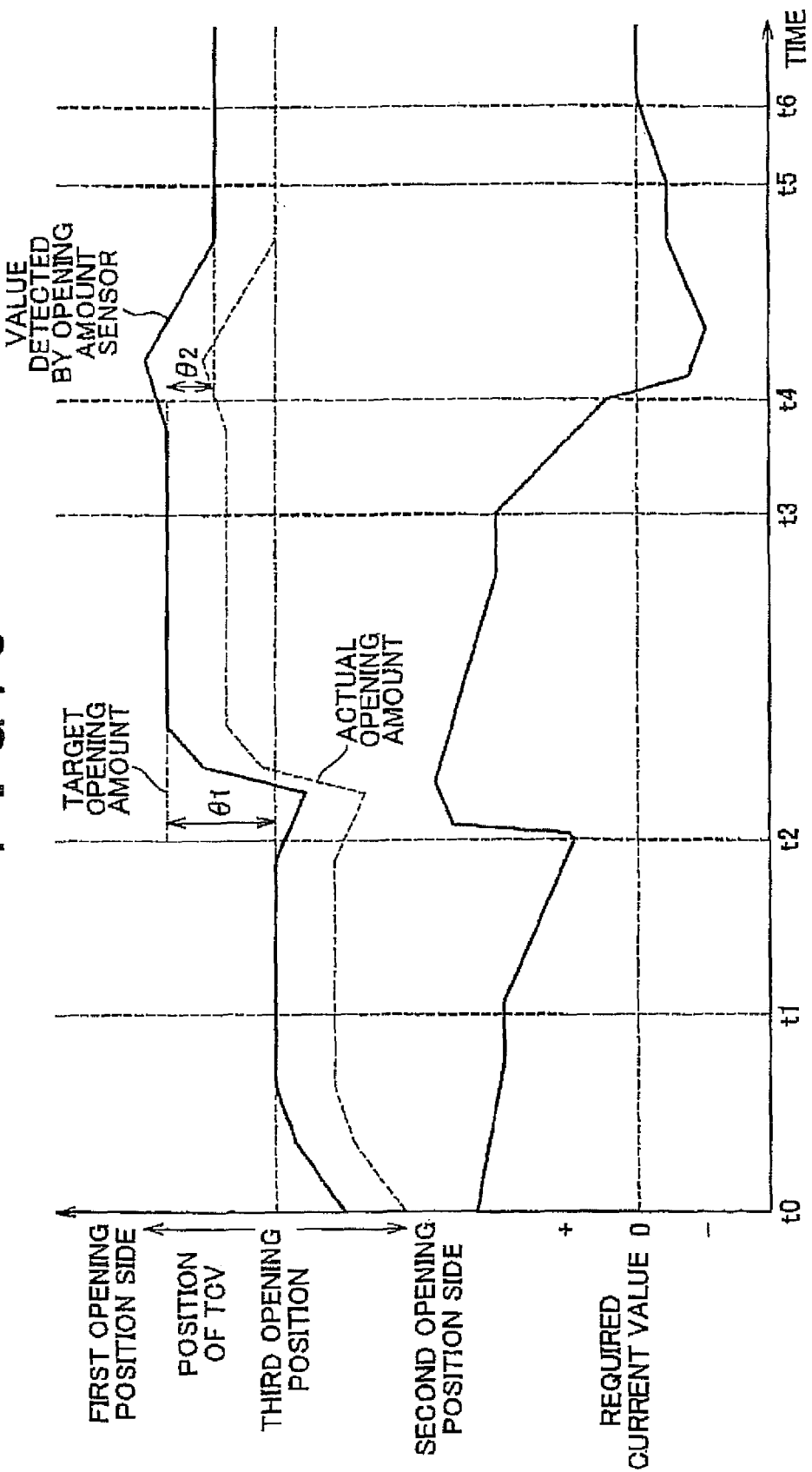

INTAKE SYSTEM FOR INTERNAL COMBUSTION ENGINE

INCORPORATION BY REFERENCE

The disclosure of Japanese Patent Application No. 2008-315733 filed on Dec. 11, 2008 including the specification, drawings and abstract is incorporated herein by reference in its entirety.

BACKGROUND OF THE INVENTION

1. Field of the Invention

The invention relates to an intake system for an internal combustion engine, which includes an intake air flow control valve that is formed of a valve body that adjusts the flow passage area in an intake pipe and a valve shaft about which the valve body pivots.

2. Description of the Related Art

In an internal combustion engine, the combustion efficiency is improved by producing vortex flows in the intake air that is supplied to a combustion chamber. Generally, vortex flows are classified into a swirl flow, which is a lateral vortex flow that eddies and proceeds along the circumferential direction of a cylinder, and a tumble flow, which is a vertical vortex flow that eddies and proceeds along the axial direction of the cylinder.

There is an existing technology in which a tumble control valve (hereinafter, referred to as "TCV") is provided in an intake pipe to produce a tumble flow in an intake air flow. In an internal combustion engine that is provided with a TCV, the flow passage area in an intake pipe is adjusted by controlling the TCV. The flow of the intake air that passes through a space around the TCV is changed based on the flow passage area, and the intake air flow is constricted by passing through the space around the TCV. If the constricted intake air flow enters a combustion chamber, a tumble flow is produced in the combustion chamber. For example, Japanese Patent Application Publication No. 2001-248450 (JP-A-2001-248450) describes a TCV that includes a valve body that is provided in an intake pipe and a valve shaft that extends perpendicularly to the center line of the intake pipe. The opening amount of the TCV is adjusted within an opening amount range from the first opening amount to the second opening amount. The flow passage area when the opening amount of the TCV is the first opening amount differs from the flow passage area when the opening amount of the TCV is the second opening amount. The intake air passes through a space between the valve body of the TCV and the wall of the intake pipe, and is constricted to the space side. The constricted intake air flow is introduced into a combustion chamber, and then hits the wall of the combustion chamber to produce a tumble flow in the combustion chamber. Because the gas in the combustion chamber is stratified by the tumble flow, efficient combustion takes place and the combustion efficiency is improved.

However, the orientation of the valve body of the TCV described in JP-A-2001-248450 is always against the flow of the intake air. Therefore, even if an actuator is driven in order to maintain the opening amount of the TCV, it is not possible to reliably maintain the opening amount. In addition, it is considered that the position of the valve body is always changed by the intake air flow and adjustment of the position of the valve body, which is made by the actuator. Accordingly, it is difficult to maintain the optimum opening amount. Such a problem may occur not only in the TCV described in JP-A-2001-248450 but also in any intake systems that include a TCV that has a valve body of which the opening amount is required to be maintained at the first opening amount or the second opening amount.

SUMMARY OF THE INVENTION

The invention provides an intake system for an internal combustion engine, with which the opening amount of a valve body of an intake air flow control valve is more stably maintained at each of the first opening amount and the second opening amount.

Hereafter, an aspect of the invention and modifications of the aspect of the invention, and the effects thereof will be described.

An aspect of the invention relates to an intake system for an internal combustion engine, which includes: an intake air flow control valve that is formed of a valve body that adjusts a flow passage area in an intake pipe and a valve shaft about which the valve body pivots; a control unit that adjusts, a valve opening amount, which is an opening amount of the intake air flow control valve, to adjust an intensity of a swirl flow, and that adjusts the valve opening amount within a valve opening amount range from a first opening amount to a second opening amount; a first rotation restriction portion that contacts the intake air flow control valve when the valve opening amount is the first opening amount to prevent the valve body from moving beyond a first opening position at which the valve opening amount is the first opening amount; and a second rotation restriction portion that contacts the intake air flow control valve when the valve opening amount is the second opening amount to prevent the valve body from moving beyond a second opening position at which the valve opening amount is the second opening amount. The valve body is divided into a long valve portion and a short valve portion by the valve shaft, a length from the valve shaft to a tip of the long valve portion is greater than a length from the valve shaft to a tip of the short valve portion, and the long valve portion is located upstream of the short valve portion. When the valve opening amount is the first opening amount, the intake air flow control valve is pushed against the first rotation restriction portion by an intake air flowing through the intake pipe. When the valve opening amount is the second opening amount, the intake air flow control valve is pushed against the second rotation restriction portion by the intake air flowing through the intake pipe.

In the aspect of the invention described above, the opening amount that is achieved when one of the valve body and the valve shaft is pushed against the first rotation restriction portion is set as the first opening amount, and the opening amount that is achieved when one of the valve body and the valve shaft is pushed against the second rotation restriction portion is set as the second opening amount. Therefore, when the valve opening amount is the first opening amount or the second opening amount, a flow of the intake air is applied to the valve body in such a direction that the valve opening amount is maintained at the first opening amount or the second opening amount. Accordingly, it is possible to maintain the valve body of the intake air flow control valve in the first valve opening position or the second valve opening position more stably.

In the aspect of the invention described above, when the valve opening amount is the first opening amount, the first rotation restriction portion may contact the valve shaft to restrict rotation of the valve shaft; when the valve opening amount is the second opening amount, the second rotation restriction portion may contact the valve shaft to restrict the rotation of the valve shaft; when the valve opening amount is the first opening amount, the valve body may be maintained in the first opening position with the valve shaft pushed against the first rotation restriction portion by the intake air flowing through the intake pipe; and when the valve opening amount is the second opening amount, the valve body may be maintained in the second opening position with the valve shaft pushed against the second rotation restriction portion by the intake air flowing through the intake pipe.

In the configuration described above, when the valve opening amount is the first opening amount or the second opening amount, the first rotation restriction portion or the second rotation restriction portion contacts the valve shaft to restrict the rotation of the valve shaft. For example, if the valve body is pushed against a wall face, the valve body may be broken. In contrast, the valve shaft is less likely to be broken. Accordingly, if the valve shaft contacts the rotation restriction portion, it is possible to appropriately restrict the rotation of the valve shaft.

In the configuration described above, the control unit may operate the valve body using, as the first opening amount, a valve opening amount that is achieved when the tip of the long valve portion is positioned near a first wall face that is a part of a wall face of the intake pipe, and using, as the second opening amount, a valve opening amount that is achieved when the tip of the long valve portion is positioned near a second wall face that is a part of the wall face of the intake pipe and that is opposed to the first wall face; when there is a command to change the valve opening amount to the first opening amount, the control unit may operate the intake air flow control valve until the valve shaft contacts the first rotation restriction portion; and when there is a command to change the valve opening amount to the second opening amount, the control unit may operate the intake air flow control valve until the valve shaft contacts the second rotation restriction portion.

In the aspect described above, the first rotation restriction portion may be a first wall face that is a part of a wall face of the intake pipe and that corresponds to the tip of the long valve portion; the second rotation restriction portion may be a second wall face that is a part of the wall face of the intake pipe and that is opposed to the first wall face; when the valve opening amount is the first opening amount, the valve body may be maintained in the first opening position while being pushed against the first wall face by the intake air flowing through the intake pipe; and when the valve opening amount is the second opening amount, the valve body may be maintained in the second opening position while being pushed against the second wall face by the intake air flowing through the intake pipe.

In the configuration described above, when the valve opening amount is the first opening amount or the second opening amount, the first wall face or the second wall face contacts the tip of the long valve portion of the valve body to restrict the rotation of the valve shaft. If the opening amount is maintained by bringing the valve body and the rotation restriction portion in contact with each other, the first wall face and the second wall face that are part of the inner wall of the intake pipe may be used as the first rotation restriction portion and the second rotation restriction portion, respectively. Accordingly, design change from the existing intake pipe is smaller than that when the valve shaft and the rotation restriction portion are brought in contact with each other.

In the configuration described above, the control unit may operate the valve body using, as the first opening amount, a valve opening amount that is achieved when the tip of the long valve portion contacts the first wall face that is a part of the wall face of the intake pipe, and using, as the second opening amount, a valve opening amount that is achieved when the tip of the long valve portion contacts the second wall face that is a part of the wall face of the intake pipe and that is opposed to the first wall face; when there is a command to change the valve opening amount to the first opening amount, the control unit may operate the intake air flow control valve until the tip of the long valve portion contacts the first wall face; and when there is a command to change the valve opening amount to the second opening amount, the control unit may operate the intake air flow control valve until the tip of the long valve portion contacts the second wall face.

In the aspect of the invention described above, if the valve opening amount detected by the opening amount detector is changed toward the first opening amount due to the adjustment of the supply current value toward the minimum current value, the control unit may determine that the actual valve opening amount indicates a position that is closer to the first opening position than the third opening position is; and if the valve opening amount detected by the opening amount detector is changed toward the second opening amount due to the adjustment of the supply current value toward the minimum current value, the control unit may determine that the actual valve opening amount indicates a position that is closer to the second opening position than the third opening position is.

In the configuration described above, the valve opening amount at which the flow passage area in the intake pipe is the maximum value is used as the third opening amount. Therefore, it is possible to sufficiently reduce the resistance of the intake air flow control valve against the intake air flowing through the intake pipe.

In the aspect of the invention described above, after one of the valve body and the valve shaft is brought into contact with the first rotation restriction portion according to a command to change the valve opening amount to the first opening amount, the control unit may refrain from transmitting a command to maintain the valve opening amount at the first opening amount to the intake air flow control valve.

In the configuration described above, a command to maintain the valve body in the first opening position is not transmitted to the intake air flow control valve because the valve body is pushed toward the wall face, for example, the valve body is pushed against the first rotation restriction portion by the intake air when the valve opening amount is the first opening amount. Thus, it is possible to reduce the amount of electric power that is consumed to control the intake air flow control valve.

In the aspect of the invention described above, after one of the valve body and the valve shaft is brought into contact with the second rotation restriction portion according to a command to change the valve opening amount to the second opening amount, the control unit may refrain from transmitting a command to maintain the valve opening amount at the second opening amount to the intake air flow control valve.

In the configuration described above, a command to maintain the valve body in the second opening position is not transmitted to the intake air flow control valve because the valve body is pushed toward the wall face, for example, the valve body is pushed against the second rotation restriction portion by the intake air when the valve opening amount is the second opening amount. Thus, it is possible to reduce the amount of electric power that is consumed to control the intake air flow control valve.

In the aspect of the invention described above, in a case where a cross section of the intake pipe that includes a center line of the intake pipe that extends in a direction of an air flow and that is parallel to a center line of a cylinder is used as a reference cross section, the reference cross section is divided into two regions by the center line of the intake pipe, one of the two regions that is communicated at a downstream portion with a center portion of a combustion chamber is an upper region, the other of the two regions that is communicated at a downstream portion with a perimeter portion of the combustion chamber is a lower region, an axis of the valve shaft may be set to a position that is offset from the center line of the intake pipe in the reference cross section and that is in one of the upper region and the lower region.

In the configuration described above, an entirety of the valve shaft in a projection view that is obtained when being projected into the reference cross section in an axial direction of the valve shaft may belong to one of the upper region and the lower region.

In the configuration described above, the axis of the valve shaft may be perpendicular to the reference cross section.

In the aspect of the invention described above, when the valve opening amount is the first opening amount, a first short valve side passage may be formed between the tip of the short valve portion and a wall face of the intake pipe as a part of an intake passage and an intake air flow between the tip of the long valve portion and the wall of the intake pipe is blocked; when the valve opening amount is the second opening amount, a second short valve side passage may be formed between the tip of the short valve portion and the wall face of the intake pipe as a part of the intake passage and an intake air flow between the tip of the long valve portion and the wall of the intake pipe is blocked; and a flow passage area of the first short valve side passage may be maintained smaller than a flow passage area of the second short valve side passage, whereby an intensity of a swirl flow that is produced in a combustion chamber when the valve opening amount is the first opening amount is maintained higher than an intensity of a swirl flow that is produced in the combustion chamber when the valve opening amount is the second opening amount.

In the configuration described above, there may be further provided an opening amount detector that detects the valve opening amount; and a current detector that detects a supply current value which is a value of an electric current that is supplied to an actuator for the intake air flow control valve. The control unit may operate the valve body using, as a third opening amount, an opening amount at which the flow passage area in the intake pipe is a maximum value and a resistance of the valve body against the intake air is a minimum value. When there is a command to change the valve opening amount to the third opening amount, the control unit may control the valve opening amount based on the valve opening amount detected by the opening amount detector and the current value detected by the current detector.

The valve opening amount detected by the opening amount detector may deviate from the actual valve opening amount. Therefore, it is difficult to reliably maintain the actual valve opening amount at the third opening amount based only on the valve opening amount detected by the opening amount detector. It is possible to obtain, in advance, the supply current value that is required to maintain the actual valve opening amount at the third opening amount, because the resistance of the valve body against the intake air is the minimum value when the valve body is in the third opening position. Therefore, it is possible to determine whether the actual valve opening amount is the third opening amount based on at least one of the valve opening amount detected by the opening amount detector and the supply current value for an actuator.

Therefore, in the configuration described above, when there is a command to change the valve opening amount to the third opening amount, the valve opening amount is adjusted based on the valve opening amount detected by the opening amount detector and the current value detected by the current detector. Accordingly, it is possible to more reliably maintain the actual valve opening amount at the third opening amount.

In the configuration described above, the control unit may use, as the minimum current value, a current value at which an actual valve opening amount is maintained at the third opening amount even if a force for maintaining the valve opening amount is decreased when the actual valve opening amount is the third opening amount; the control unit may adjust the supply current value toward the minimum current value when the valve opening amount detected by the valve opening amount detector is the third opening amount; and if the valve opening amount detected by the opening amount detector deviates from the third opening amount due to the adjustment of the supply current value, the control unit may determine that the actual valve opening amount is not maintained at the third opening amount.

If a force produced by the actuator to maintain the valve opening amount falls below a force of the intake air to push the valve body because the supply current value is changed toward the minimum current value when the opening amount detected by the opening amount detector is the third opening amount but the actual valve opening amount deviates from the third opening amount, the actual valve opening amount is changed toward the first opening amount or the second opening amount.

Therefore, in the configuration described above, it is determined whether the actual valve opening amount is the third opening amount, that is, whether the valve opening amount detected by the opening amount detector deviates from the actual opening amount by adjusting the supply current value when the valve opening amount detected by the opening amount detector is the third opening amount. Thus, if the valve opening amount detected by the opening amount detector deviates from the actual valve opening amount, it is possible to change the actual valve opening amount to the third opening amount in consideration of the fact that the valve opening amount detected by the opening amount detector deviates from the actual valve opening amount.

In the configuration described above, the control unit may use, as the minimum current value, a current value at which an actual valve opening amount is maintained at the third opening amount even if a force for maintaining the valve opening amount is decreased when the actual valve opening amount is the third opening amount; the control unit may adjust the supply current value toward the minimum current value if the valve opening amount detected by the valve opening amount detector is a target valve opening amount when there is a command to change the valve opening amount to the third opening amount; and if the valve opening amount detected by the opening amount detector is still maintained at the target valve opening amount when the supply current value reaches the minimum current value due to the adjustment of the supply current value, the control unit may determine that the actual valve opening amount is maintained at the third opening amount.

When the actual valve opening amount is the third opening amount, even if the supply current value for the actuator is set to the minimum current value, the actual valve opening amount is maintained at the third opening amount, that is, the actual valve opening amount is maintained at a certain value. Accordingly, in this case, even if the valve opening amount detected by the opening amount detector deviates from the actual valve opening amount, the valve opening amount detected by the opening amount detector exhibits a certain value based on the actual valve opening amount. When the valve opening amount is adjusted based on the valve opening amount detected by the opening amount detector and the current value detected by the current detector, the degree of deviation of the valve opening amount detected by the opening amount detector from the actual valve opening amount is reflected in the target valve opening amount. Therefore, if the valve opening amount detected by the opening amount detector exhibits the target valve opening amount when there is a command to change the valve opening amount to the third opening amount, it is estimated that the actual valve opening amount is the third opening amount.

Therefore, according to the configuration described above, it is determined whether the actual valve opening amount is the third opening amount by adjusting the supply current value when the valve opening amount detected by the opening amount detector exhibits the target valve opening amount. Accordingly, even if the valve opening amount detected by the opening amount detector deviates from the actual valve opening amount, it is possible to determine that the actual valve opening amount is the third opening amount.

In the configuration described above, if the valve opening amount detected by the opening amount detector is changed toward the first opening amount due to the adjustment of the supply current value toward the minimum current value, the control unit may determine that the actual valve opening amount indicates a position that is closer to the first opening position than the third opening position is; and if the valve opening amount detected by the opening amount detector is changed toward the second opening amount due to the adjustment of the supply current value toward the minimum current value, the control unit may determine that the actual valve opening amount indicates a position that is closer to the second opening position than the third opening position is.

If a force produced by the actuator to maintain the valve opening amount falls below a force of the intake air to push the valve body because the supply current value is changed toward the minimum current value when the opening amount detected by the opening amount detector is the third opening amount but the actual valve opening amount deviates from the third opening amount, the actual valve opening amount is changed toward the first opening amount or the second opening amount. That is, if the actual valve opening amount indicates the position that is closer to the first opening position than the third opening position is before the supply current value is adjusted, the valve opening amount is changed toward the first opening amount. If the actual valve opening amount indicates the position that is closer to the second opening position than the third opening position is before the supply current value is adjusted, the valve opening amount is changed toward the second opening amount.

Therefore, in the configuration described above, it is determined whether the position corresponding to the actual valve opening amount is closer to the first opening position than the third opening position is or closer to the second opening position than the third opening position is based on the opening amount detected by the opening amount detector after the supply current value is adjusted. Therefore, it is possible to accurately determine the direction in which the position corresponding to the valve opening amount detected by the opening amount detector is offset from the position corresponding to the actual valve opening amount.

In the configuration described above, if the control unit determines that the actual valve opening amount indicates the position that is closer to the first opening position than the third opening position is, the control unit may set a target valve opening amount to a value other than the third opening amount based on a difference between the supply current value detected by the current detector and the minimum current value, and then adjust the supply current value in such a manner that the valve opening amount detected by the opening amount detector becomes equal to the target valve opening amount; and if the control unit determines that the actual valve opening amount indicates the position that is closer to the second opening position than the third opening position is, the control unit may set the target valve opening amount to a value other than the third opening amount based on the difference between the supply current value detected by the current detector and the minimum current value, and then adjust the supply current value in such a manner that the valve opening amount detected by the opening amount detector becomes equal to the target valve opening amount.

When it is determined that the position corresponding to the actual valve opening amount is closer to the first opening position or the second opening position than the third opening position is, the difference between the supply current value and the minimum current value reflects the deviation of the valve opening amount detected by the opening amount detector from the actual valve opening amount.

Therefore, in the configuration described above, the new target valve opening amount is set to a value other than the third opening amount based on the difference between the supply current value and the minimum current value. As a result, it is possible to change the actual valve opening amount to the third opening amount even if the valve opening amount detected by the opening amount detector deviates from the actual valve opening amount.

In the configuration described above, if the valve opening amount detected by the opening amount detector reaches the target valve opening amount due to the adjustment of the supply current value, the control unit may adjust the supply current value toward the minimum current value; and if the valve opening amount detected by the opening amount detector is still equal to the target valve opening amount when the supply current value reaches the minimum current value due to the adjustment of the supply current value, the control unit may determine that the actual valve opening amount is maintained at the third opening amount.

When the valve opening amount detected by the opening amount detector is the target valve opening amount based on the supply current value and the minimum current value, it is estimated that the actual valve opening amount is the third opening amount.

Therefore, in the configuration described above, when the valve opening amount detected by the opening amount detector is the target valve opening amount, the supply current value is changed toward the minimum current value again. If the valve opening amount detected by the opening amount detector is the target valve opening amount after the change in the supply current value, it is determined that the actual valve opening amount is the third opening amount. Thus, it is possible to more accurately determine that the actual valve opening amount is the third opening amount.

In the configuration described above, if the valve opening amount detected by the opening amount detector deviates from the target valve opening amount due to the adjustment of the supply current value toward the minimum current value, the control unit may determine that the actual valve opening amount is not maintained at the third opening amount, and execute again a series of processes that includes a process of setting the target valve opening amount based on the difference between the supply current value and the minimum current value, a process of adjusting the supply current value to bring the valve opening amount detected by the opening amount detector to the target valve opening amount, a process of adjusting the supply current value toward the minimum current value when the valve opening amount detected by the opening amount detector is the target valve opening amount, and a process of determining a relationship between the actual valve opening amount and the third opening amount based on a manner in which the valve opening amount detected by the opening amount detector is changed clue to the adjustment of the supply current value.

BRIEF DESCRIPTION OF THE DRAWINGS

The foregoing and further objects, features and advantages of the invention will become apparent from the following description of an example embodiment with reference to the accompanying drawings, wherein the same or corresponding portions will be denoted by the same reference numerals and wherein:

FIG. 1 is a cross-sectional view showing the cross section structure of an intake system for an internal combustion engine according to an embodiment of the invention;

FIG. 2A is a cross-sectional view showing the cross section structure of the intake system according to the embodiment;

FIG. 2B is a side view showing the side structure of the intake system;

FIG. 2C is a cross-sectional view showing the cross section structure of the intake system according to the embodiment;

FIG. 2D is a side structure of the intake system according to the embodiment;

FIG. 2E is a cross-sectional view showing the cross section structure of the intake system according to the embodiment;

FIG. 2F is a side view showing the front structure of the intake system according to the embodiment;

FIG. 6 is a timing chart showing an example of a manner of executing "the process of adjusting the opening amount when the TCV is required to be in the third opening position".

DETAILED DESCRIPTION OF THE EMBODIMENT

Figure 3A:
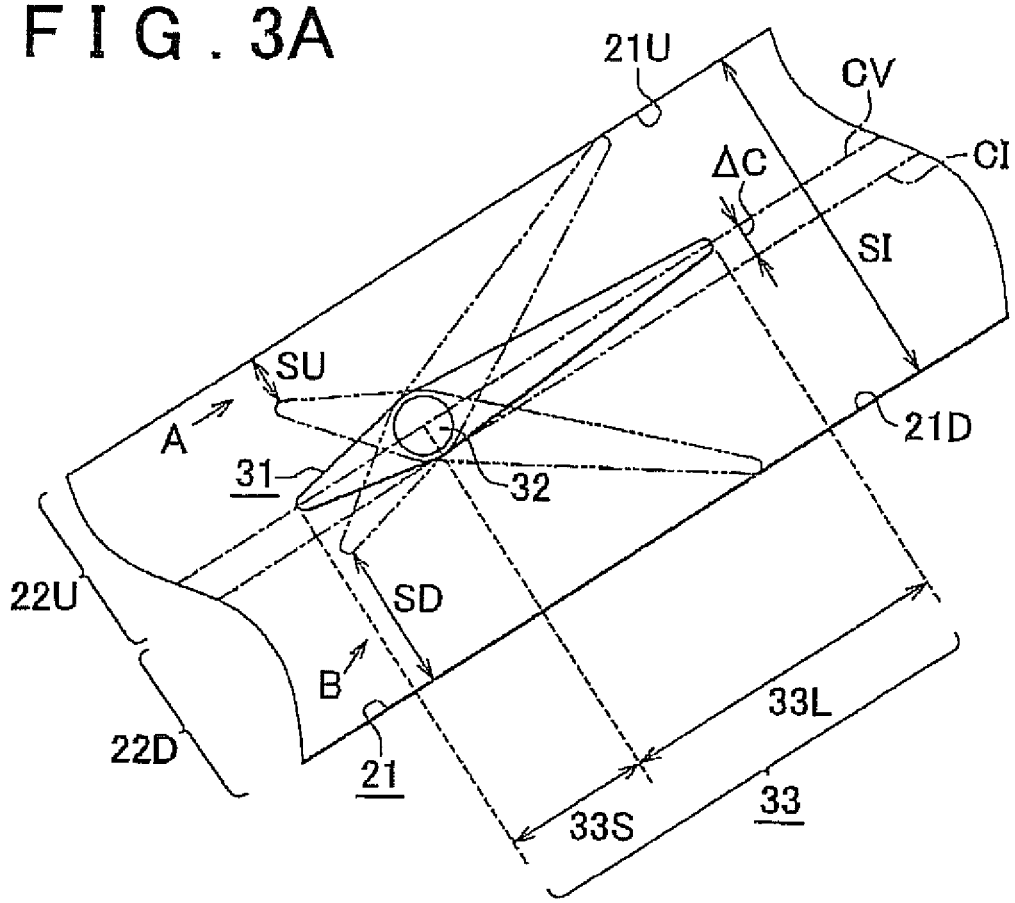
FIG. 3A is a cross-sectional view showing the cross section structure of the intake system according to the embodiment.

Hereafter, an intake system for an internal combustion engine according to an embodiment of the invention will be described with reference to FIGS. 1 to 4.

An intake system 20 for an internal combustion engine according to the embodiment of the invention includes a tumble control valve (hereinafter, referred to as "TCV") 31 that serves as an intake air flow control valve and that adjusts the scale of a tumble flow. As shown in FIG. 1, in an intake pipe 21 of an internal combustion engine 1, the TCV 31 is provided at a position that is near a combustion chamber 11 of an engine body 10 and upstream of a fuel injection valve 25. The intake air introduced through the inlet of the intake pipe 21 passes through a portion at which the TCV 31 is provided, and is mixed with the fuel injected from the fuel injection valve 25 so that an air-fuel mixture is formed. Then, the air-fuel mixture flows into the combustion chamber 11 when an intake valve 12 is opened.

A control unit 40 executes an overall control over the internal combustion engine 1. The control unit 40 includes various sensors such as an opening amount sensor 34 for the TCV 31 and an electronic control unit 41.

The flow passage in the intake pipe 21 is divided into two regions, that is, an upper region 22U and a lower region 22D by a center line CI of the intake pipe 21, in a cross section of the intake pipe 21 (reference cross section), which includes the center line that extends in the flow direction of the intake air shown in FIG. 1 and that is parallel to the center line of a cylinder. The downstream portion of the upper region 22U is communicated with the center portion of the combustion chamber 11, and the downstream portion of the lower region 22D is communicated with the perimeter portion of the combustion chamber 11.

An intake air flow control unit 30 includes the TCV 31 and a motor 35 that drives the TCV 31. The TCV 31 is formed of a valve shaft 32 and a valve body 33. The axis of the valve shaft 32 is at a position that is offset from the center line of the intake pipe 21 in the reference cross section, that is, the axis of the valve shaft 32 is in the upper region 22U, and the axis is perpendicular to the reference cross section. As shown in FIG. 2B, the valve shaft 32 passes through the intake pipe 21, and an end portion 32T of the valve shaft 32 projects outward from the outer wall of the intake pipe 21. In addition, the valve shaft 32 has a contact portion 32A that projects from the outer periphery of the end portion 32T. The contact portion 32A contacts one of a first rotation restriction portion 23 and a second rotation restriction portion 24 that project from the outer wall of the intake pipe 21 and that are arranged on the outer periphery of the end portion 32T, whereby the rotational angle of the valve shaft 32 is restricted.

The entirety of the valve shaft 32 is located within the upper region 22U in its axial direction. The valve body 33 is a flat member, and pivots about the valve shaft 32 so as to adjust the flow passage area. The valve body 33 is divided into a long valve portion 33L and a short valve portion 33S using the valve shaft 32 as the boundary. The length from the valve shaft 32 to the tip of the long valve portion 33L is greater than the length from the valve shaft 32 to the tip of the short valve portion 33S.

The motor 35, which serves as an actuator, and the opening amount sensor 34 are connected to the valve shaft 32, and the motor 35 and the opening amount sensor 34 are connected to the electronic control unit 41. The valve shaft 32 is driven by the motor 35 that is driven according to a command from the electronic control unit 41, whereby the valve body 33 is driven to adjust the flow passage area. The position of the valve body 33 is monitored by the opening amount sensor 34, and a signal that indicates the value detected by the opening amount sensor 34 is transmitted to the electronic control unit 41. Then, a required current value, that is, a value of an electric current that is required to drive the motor 35, is determined by the electronic control unit 41 based on the value detected by the opening amount sensor 34; and an electric current of which the value is equal to the required current value is output to the motor 35.

The size of the long valve portion 33L is set in such a manner that when the TCV 31 is driven to adjust the flow passage area by driving the valve shaft 32, the tip of the long valve portion 33L reaches its closest point to the wall of the intake pipe 21 in the upper region 22U or the lower region 22D with a slight clearance left between the wall of the intake pipe 21 and the tip of the long valve portion 33L. The size of the short valve portion 33S is set in such a manner that when the tip of the long valve portion 33L reaches it closest point to the wall of the intake pipe 21, the short valve portion 33S is apart from the wall of the intake pipe 21 so that a space used as an intake passage is formed between the short valve portion 33S and the wall of the intake pipe 21. The valve shaft 32 is provided in the upper region 22U that is on the upper side of the center line CI of the intake pipe 21, and the axis of the valve shaft 32 is perpendicular to the reference cross section. Therefore, when the TCV 31 is driven to bring the tip of the long valve portion 33L to its closest point to the wall of the intake pipe 21, the flow passage area in the intake pipe 21 and the direction in which the intake air flow is deflected vary depending on whether the tip of the long valve portion 33L is in the upper region 22U or the lower region 22L.

The manner in which the TCV 31 is driven and the manner in which an intake air flow proceeds will be described with reference to FIGS. 2A to 2F. FIGS. 2A, 2C and 2E on the left side show the reference cross sections of the intake pipe 21, and FIGS. 2B, 2D and 2F on the right side show the side views of the end portion 32T of the valve shaft 32 on the face that is parallel to the reference cross section. FIGS. 2B, 2D and 2F correspond to FIGS. 2A, 2C and 2E, respectively.

FIG. 2A shows the state where the TCV 31 is in the third opening position at which the opening amount thereof is the maximum value. In this state, because the valve body 33 extends parallel to the flow direction of the intake air and the center line CI of the intake pipe 21, the intake air flows through a portion of the upper region 22U, which is on the upper side of the valve body 33, and the lower region 22D. Also, because the valve body 33 extends parallel to the flow direction of the intake air, the pressure loss of the intake air flow is smaller than the pressure loss when the TCV 31 is in any other opening positions. In this state, as shown in FIG. 2B, the contact portion 32A of the end portion 32T that project outward from the outer wall of the intake pipe 21 contacts neither the first rotation restriction portion 23 nor the second rotation restriction portion 24.

As shown in FIG. 2C, when the TCV 31 is in the first opening position, a first short valve side passage A is formed between the tip of the short valve portion 33S of the TCV 31 and a second wall face 21U, as a part of the intake passage, and the air flow between the tip of the long valve portion 33L and a first wall face 21D is blocked. That is, when the valve body 33 is placed in the first opening position at which the tip of the long valve portion 33L reaches its closest point to the wall of the intake pipe 21 in the lower region 221) (first wall face 21D), the intake air flows downstream, that is, toward the combustion chamber 11 through the first short valve side passage A formed between the tip of the short valve portion 33S of the valve body 33 and the wall of the intake pipe 21 in the upper region 22U (second wall face 21U). Then, as shown in FIG. 2D, in this state, the contact portion 32A of the end portion 32T contacts the first rotation restriction portion 23 so that the rotational direction of the valve shaft 32 is restricted. The long valve portion 33L is pushed toward the first wall face 21D by the intake air flow. However, the contact portion 32A contacts the first rotation restriction portion 23 before the tip of the long valve portion 33L contacts the first wall face 21D. Therefore, a slight clearance is left between the first wall face 21D and the tip of the long valve portion 33L.

As shown in FIG. 2E, when the TCV 31 is in the second opening position, a second short valve side passage B is formed between the tip of the short valve portion 33S of the TCV 31 and the first wall face 21D, as a part of the intake passage, and the flow of the intake air between the tip of the long valve portion 33L and the second wall face 21U is blocked. That is, when the valve body 33 is placed in the second opening position at which the tip of the long valve portion 33L reaches its closest point to the second wall face 21U of the intake pipe 21, the intake air flows downstream through the second short valve side passage B formed between the tip of the short valve portion 33S of the valve body 33 and the first wall face 21D. As shown in FIG. 2F, in this state, the contact portion 32A of the end portion 32T contacts the second rotation restriction portion 24 so that the rotational direction of the valve shaft 32 is restricted. The long valve portion 33L is pushed toward the second wall face 21U by the intake air flow. However, the contact portion 32A contacts the second rotation restriction portion 24 before the tip of the long valve portion 33L contacts the second wall face 21U. Therefore, a slight clearance is left between the first wall face 21D and the tip of the long valve portion 33L.

Because the valve shaft 32 is at a position that is offset from the center line CI and that is in the upper region 22U, the flow passage area of the first short valve side passage A is maintained smaller than the flow passage area of the second short valve side passage B. That is the flow passage area varies depending on whether the TCV 31 is in the first opening position or the second opening position. Therefore, the opening amount of the TCV 31 is small when the TCV 31 is in the first opening position, and is medium when the TCV 31 is in the second opening position. Thus, the intensity of a swirl flow produced in the combustion chamber 11 when the opening amount of the TCV 31 is the first opening amount is higher than the intensity of a swirl flow produced in the combustion chamber when the opening amount of the TCV 31 is the second opening amount.

When the contact portion 32 contacts the first rotation restriction portion 23 or the second rotation restriction portion 24, the valve body 33 is reliably placed in the first opening position or the second opening position. Therefore, an error in the position of the valve body 33, that is, an error in the opening amount is decreased sufficiently. The tip of the long valve portion 33L, which reaches its closest point to the wall of the intake pipe 21 when the valve body 33 is in the first opening position or the second opening position, is the uppermost stream portion within the valve body 33. Therefore, the tip of the long valve portion 33L is pushed toward the wall of the intake pipe 21 by the intake air flow. That is, the contact portion 32A is pushed against the first rotation restriction portion 23 or the second rotation restriction portion 24 on the outer wall of the intake pipe 21. Therefore, it is no longer necessary to drive the motor 35 in order to maintain the valve body 33 in the first opening position or the second opening position. In addition, in the third opening position, the valve body 33 extends parallel to the center line CI of the intake pipe 21. Therefore, the pressure that is applied to the valve body 33 by the intake air flow is decreased, and the electric power that is required to drive the motor 35 is decreased.

Figure 3B:
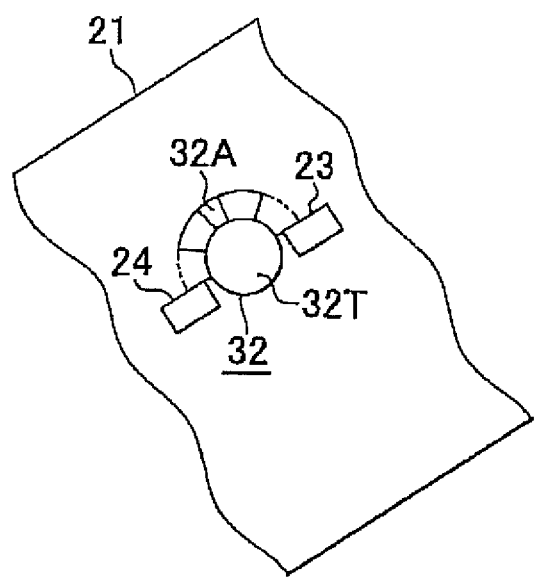
FIG. 3B is a side view showing the side structure of the intake system according to the embodiment.

Next, the intake air flow passage area when the TCV 31 is in each opening position will be described in detail with reference to FIG. 3. The TCV 31 includes the valve shaft 32, and the valve body 33 formed of the long valve portion 33L located upstream of the short valve portion 33S and the short valve portion 33S located downstream of the long valve portion 33L in the intake pipe 21. A valve body axis CV, which passes through the axis of the valve shaft 32 in the longitudinal direction of the valve body 33 and which is parallel to the center line CI when the TCV 31 is in the third opening position, is at a position that is offset from the center line CI of the intake pipe 21 by the offset amount ΔC and that is in the upper region 22U. With this structure, when the tip of the long valve portion 33L reaches its closest point to the second wall face 21U that is the wall of the intake pipe 21 in the upper region 22U, the second short valve side passage B is formed between the tip of the short valve portion 33S and the first wall face 21D of the intake pipe 21 in the lower region 22D. When the tip of the long valve portion 33L reaches its closest point to the first wall face 21D of the intake pipe 21, the first short valve side passage A is formed between the tip of the short valve portion 33S and the second wall face 21U in the upper region 22U.

Because the valve shaft 32 is at the position that is offset from the center line CI of the intake pipe 21 by the offset amount ΔC and that is in the upper region 22U, the flow passage area SD of the second short valve side passage B is larger than the flow passage area SU of the first short valve side passage A. When the maximum flow passage area in the intake pipe 21 is the flow passage area SI, the ratio of the flow passage area SD to the flow passage area SI and the ratio of the flow passage area SU to the flow passage area SI, that is, the opening amounts of the TCV 31 at the first opening position and the second opening position, may be adjusted by changing the sizes of the short valve portion 33S and the long valve portion 33L and the offset amount ΔC.

When TCV 31 is required to be moved to the third opening position or to be maintained in the third opening position, the TCV 31 is maintained in the third opening position by the motor 35. A force is always applied to the valve body 33 of the TCV 31 by the intake air flow. Therefore, a feedback control is executed so that the value detected by the opening amount sensor 34 becomes equal to the third opening amount. However, the value detected by the opening amount sensor 34 may deviate from the actual opening amount, and it is difficult to reliably maintain the TCV 31 in the third opening position only by executing the feedback control. Therefore, "a process for adjusting the opening amount when the TCV is required to be in the third opening position" described below is executed to reliably maintain the TCV 31 in the third opening position.

Figure 4:
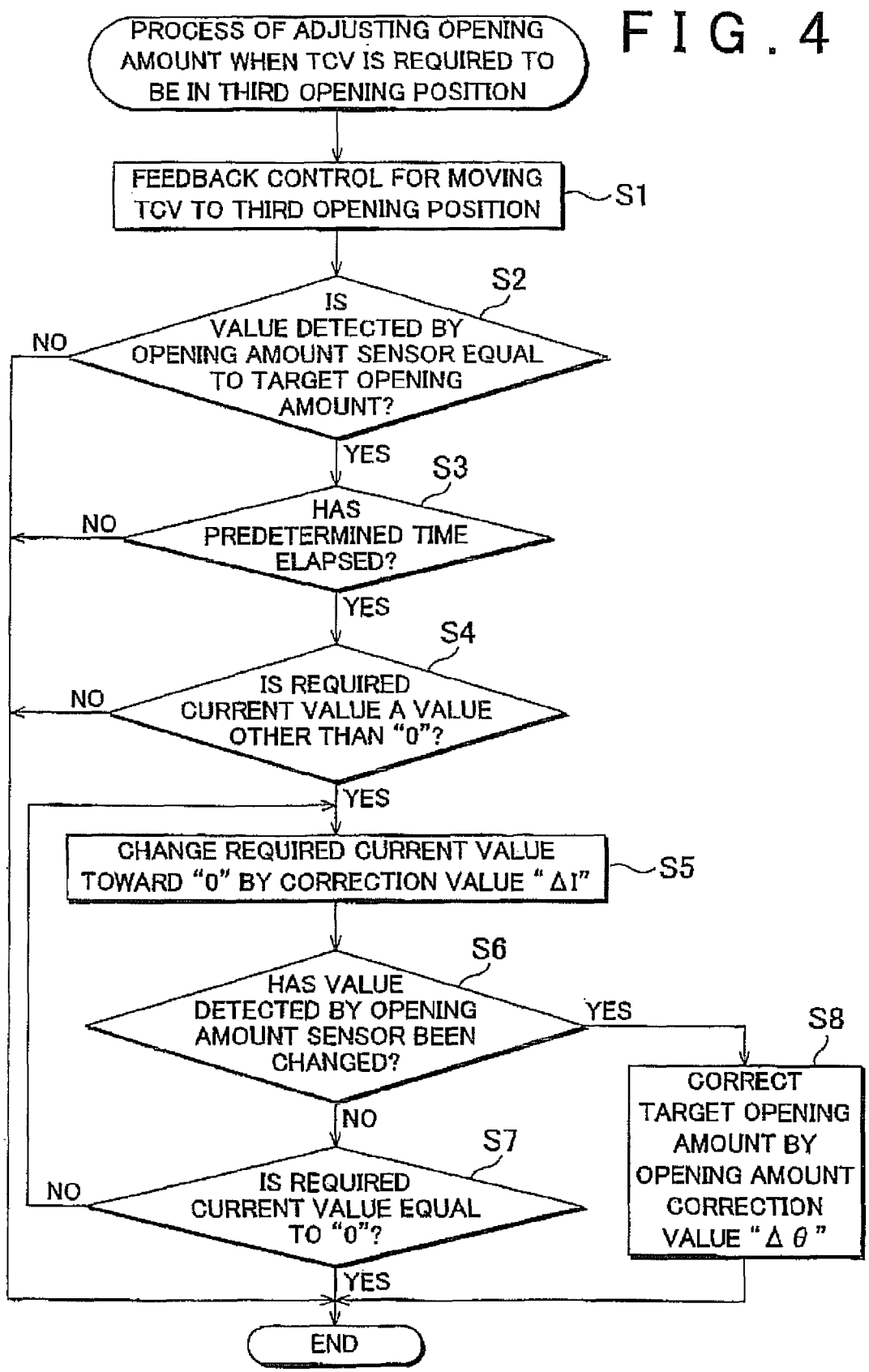
FIG. 4 is a flowchart showing "a process of adjusting the opening amount when a TCV is required to be in the third opening position"

"The process for adjusting the opening amount when the TCV is required to be in the third opening position" will be described with reference to FIG. 4. In this process, the value detected by the opening amount sensor 34, which serves as an opening amount detector that detects the opening amount, is used, and the required current value that is the value of an electric current output to the motor 35 is used as a value detected by a current detector that detects the value of an electric current that is supplied to the motor 35.

In "the process for adjusting the opening amount when the TCV is required to be in the third opening position", the valve body 33 is controlled using, as the third opening amount, the opening amount at which the flow passage area in the intake pipe 21 is the maximum value, that is, the opening amount at which the resistance of the valve body 33 against the intake air is the minimum value. If a command to adjust the opening amount to the third opening amount is issued, that is, a command to place the valve body 33 in the third opening position is issued, the opening amount of the TCV 31 is adjusted based on the value detected by the opening amount sensor 34 and the required current value.

In response to issuance of a command to place the TCV 31 in the third opening position, a feedback control for placing the TCV 31 in the third opening position in S1 is started. The feedback control is executed so that the detection value becomes equal to the target value. For example, a PID control may be executed as a feedback control. In this process, the required current value for the motor 35 that drives the valve shaft 32 of the TCV 31 is adjusted so that the value detected by the opening amount sensor 34 for the TCV 31 becomes equal to the target opening amount.

It is determined in S2 whether the value detected by the opening amount sensor 34 is brought to the target opening amount by the feedback control. If it is determined that the value detected by the opening amount sensor 34 is not equal to the target opening amount, it is considered that the opening amount of the TCV 31 has not reached the target opening amount. Therefore, the routine ends, and the following steps are not executed until it is determined that the value detected by the opening amount sensor 34 is equal to the target opening amount. If it is determined that the value detected by the opening amount sensor 34 is equal to the target opening amount, S3 is executed. In S3, it is determined whether a predetermined time has elapsed after the value detected by the opening amount sensor 34 becomes equal to the target opening amount, that is, whether the value detected by the opening amount sensor 34 is maintained at the target opening amount. The target opening amount to which the value detected by the opening amount sensor 34 should be brought may be a predetermined range of opening amounts. In this case, if the value detected by the opening amount sensor 34 falls within the range that is set as the target opening amount, it is determined in S2 that the value detected by the opening amount sensor is equal to the target opening amount.

If it is determined that the predetermined time not has elapsed, the routine ends. On the other hand, if it is determined that the predetermined time has elapsed, it is determined whether the required current value used to maintain the valve body 33 in the current position is a value other than "0" that is the minimum current value. In this case, the minimum current value of the required current value is the minimum required current value at which, if the valve body 33 is in the third opening position, the valve body 33 is maintained in the third opening position even if the force for maintaining the position of the valve body 33 is decreased. If it is determined that the required current value is "0", the actual position of the valve body 33 coincides with the third opening position and the value detected by the opening amount sensor 34 corresponds to the third opening position. Therefore, the routine ends.

On the other hand, if it is determined in S4 that the required current value is a value other than "0", S5 is executed. In S5 to S7, when the value detected by the opening amount sensor 34 indicates the third opening position, the required current value is adjusted toward "0" and it is determined that the actual valve opening amount is not maintained at the third opening amount if the value detected by the opening amount sensor 34 deviates from the third opening amount due to the adjustment. More specifically, if the required current value is larger than "0", an electric current, which is equal to the value obtained by subtracting the correction value ΔI from the required current value, is output to the motor 35. If the required current value is smaller than "0", an electric current, which is equal to a value obtained by adding the correction value ΔI to the required current value, is output to the motor 35. That is, a control for driving the motor using a new required current value that is closer to "0" than the current required current value by the value amount ΔI is repeated so that the required current value approaches "0".

If it is determined in S6 that the value detected by the opening amount sensor 34 has not been changed and keeps indicating the target opening amount and it is determined in S7 that the required current value is not "0", S5 is executed again to drive the motor 35 using the required current value that is closer to "0" than the immediately preceding required current value by the correction value ΔI. When this control is repeatedly executed and thus the value detected by the opening amount sensor 34 exhibits the target opening amount and the required current value becomes "0", it is determined that the actual opening amount of the TCV 31 is equal to the third opening amount, and the routine ends.

If it is determined in S6 that the value detected by the opening amount sensor 34 has been changed, that is, it is determined that the value detected by the opening amount sensor 34 is not equal to the target opening amount, S8 is executed to correct the target opening amount. This is because as the required current value approaches "0", the force generated by the motor 35 to maintain the opening position of the TCV 31 is decreased. If the actual opening position of the TCV 31 is offset from the third opening position, a force for offsetting the position of the TCV 31 from the third opening position by a larger amount is applied to the TCV 31 by the intake air flow. Accordingly, if the drive power from the motor 35, which is used to maintain the opening amount against the force of the intake air flow, is decreased to a value at which the opening amount is no longer maintained against the force of the intake air flow, the position of the TCV 31 offsets from the third opening position by a larger amount. That is, it is determined that the actual position of the valve body 33 is closer to the first opening position than the third opening position is, if the value detected by the opening amount sensor 34 is changed toward the first opening amount due to the control for adjusting the required current value toward "0". Also, it is determined that the actual position of the valve body 33 is closer to the second opening position than the third opening position is, if the value detected by the opening amount sensor 34 is changed toward the second opening amount.

Figure 5:
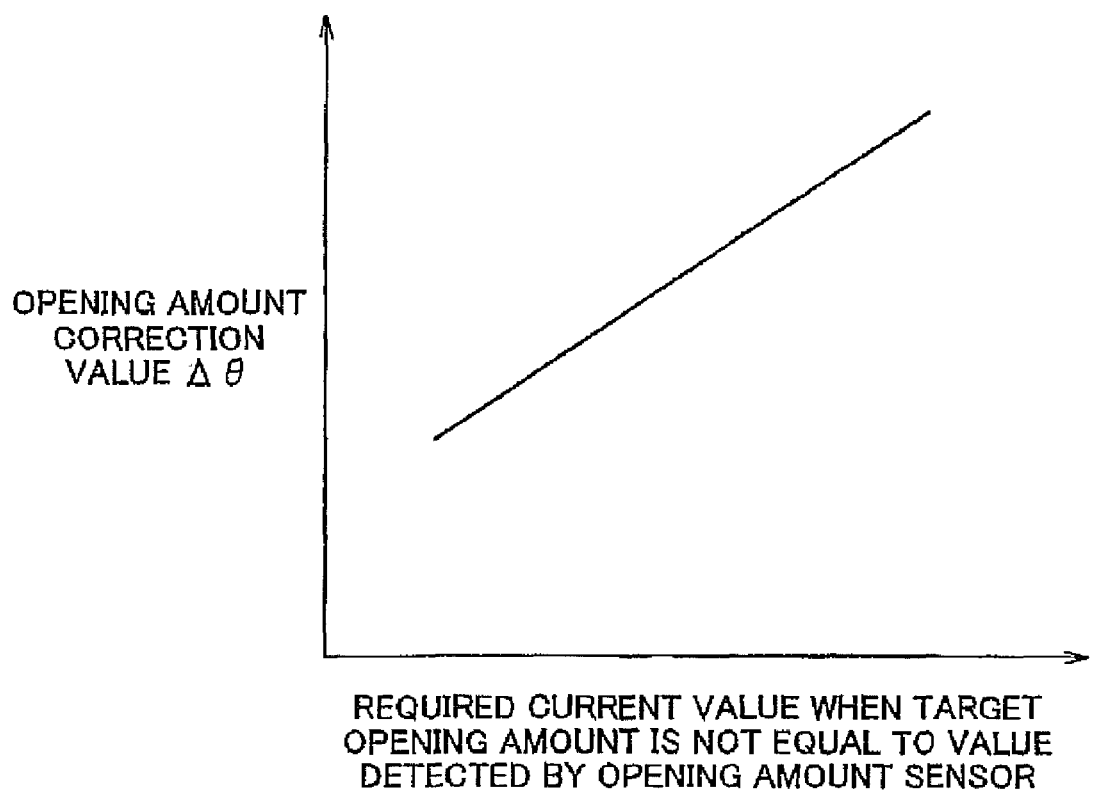
FIG. 5 is a map showing the relationship between the required current value and the correction opening amount Δθ, which is used in "the process of adjusting the opening amount when the TCV is required to be in the third opening position"

Accordingly, the target valve opening amount is set to a value different from the third opening amount based on the required current value that is exhibited when it is determined in S8 that the actual position of the valve body 33 is closer to the first opening position or the second opening position than the third opening position is. More specifically, a new target opening amount is set to a value that is obtained by correcting the value detected by the opening amount sensor 34 at the time of S6 in such a manner that the opening position of the TCV 31 is changed in a direction opposite to the direction in which the opening position of the TCV 31 is offset from the position corresponding to the target opening amount. That is, if the value detected by the opening amount sensor 34 at the time of S6 indicates the opening position that is closer to the second opening position than the position corresponding to the target opening amount is, the target opening amount is corrected by the correction opening amount $\Delta\theta$ so that the opening position of the TCV 31 approaches the first opening position by the correction opening amount $\Delta\theta$. If the value detected by the opening amount sensor 34 at the time of S6 indicates the opening position that is closer to the first opening position than the position corresponding to the target opening amount is, the target opening amount is corrected by the correction opening amount $\Delta\theta$ so that the opening position of the TCV 31 approaches the second opening position by the correction opening amount $\Delta\theta$. The correction opening amount $\Delta\theta$ is determined based on the required current value that is exhibited when it is determined that the value detected by the opening amount sensor 34 deviates the target opening amount in the process for bringing the required current value toward "0" by the correction value $\Delta\theta I$ each time. The map shown in FIG. 5 is used to calculate the correction opening amount $\Delta\theta$. That is, the smaller the required current value that is exhibited when it is determined that the value detected by the opening amount sensor 34 deviates from the target opening amount is, the smaller the correction opening amount $\Delta\theta$ is.

If the target opening amount is corrected, the routine ends, and the feedback control in S1 is executed using the value detected by the opening amount sensor 34 and the new target opening amount. If it is determined that the value detected by the opening amount sensor 34 reaches the new target opening amount as a result of the feedback control and a predetermined time has elapsed, the control for bringing the required current value toward "0" is executed in S5. If the value detected by the opening amount sensor 34 is still equal to the new target opening amount when the required current value reaches "0", it is determined that the actual valve opening amount is maintained at the third opening amount. If the value detected by the opening amount sensor 34 deviates from the new target opening amount due to the control for bringing the required current value toward the minimum current value, it is determined that the actual valve opening amount is not maintained at the third opening amount. Then, a series of the following processes is executed. That is, the target opening amount is set based on the required current value, the required current value is adjusted so that the value detected by the opening amount sensor 34 is equal to the target opening amount, the required current value is adjusted while the value detected by the opening amount sensor 34 exhibits the target opening amount, and relationship between the actual opening amount and the third opening amount is determined based on the manner in which the value detected by the opening amount sensor 34 is changed due to the adjustment. Each time the series of processes is executed, the actual position of the valve body 33 approaches the third opening position. Therefore, the required current value that is detected when it is determined that the value detected by the opening amount sensor 34 is not equal to the target opening amount is decreased each time the series of processes is executed. Therefore, the correction opening amount $\Delta\theta$ is decreased as the required current value is decreased. Accordingly, it is possible to maintain the actual position of the valve body 33 at the third opening position, that is, it is possible to maintain the actual valve opening amount at the third opening amount by repeatedly executing the "process for adjusting the opening amount when the TCV is required to be in the third opening position".

The process is repeatedly executed as long as there is a command to move the TCV 31 to the third opening position.

An example of the manner of executing the "process for adjusting the opening amount when the TCV is required to be in the third opening position" will be described with reference to FIG. 6.

If a command to place the TCV 31 in the third opening position is issued at time t0, the feedback control is executed based on the value detected by the opening amount sensor 34 to bring the opening amount of the TCV 31 to the target opening amount (third opening amount). At time t1, the value-detected by the opening amount sensor 34 becomes equal to the target opening amount at time t1. At this time, it is determined that the value detected by the opening amount sensor 34 may deviate from the actual opening amount if the required current value is not "0", and the control for bringing the required current value toward "0" is executed as an opening amount adjustment process. At time t1, because the required current value is larger than "0", an electric current of which the value is equal to a value obtained by subtracting the correction value $\Delta I$ from the required current value at time t1 is output to the motor 35. The control for bringing the required current value toward "0" by the correction value $\Delta I$ is repeatedly executed so that the required current value approaches "0". This control is continued until the value detected by the opening amount sensor 34 becomes equal to the target opening amount and the required current value becomes equal to "0". If it is determined at time, t2 that the value detected by the opening amount sensor 34 deviates from the target opening amount and indicates that the opening position of the TCV 31 is closer to the second opening position than the position corresponding to the target opening amount is, before the current value reaches "0", it is determined that the actual position of the valve body 33 of the TCV 31 is closer to the second opening position than the position corresponding to the target opening amount is. Accordingly, a new target opening amount is set to a value obtained by correcting the target opening amount by the correction opening amount $\Delta\theta1$ based on the required current value at time t2 so that the opening position of the TCV 31 approaches the first opening position by the correction opening amount $\Delta\theta1$. If the value detected by the opening amount sensor 34 deviates from the target opening amount, the feedback control is executed again.

After the feedback control, if it is determined at time t3 that the value detected by the opening amount sensor 34 is equal to the target opening amount and the required current value is not equal to "0", the required current value is adjusted again. At time t3, because the required current value is larger than "0", an electric current of which the value is equal to a value obtained by subtracting the correction value $\Delta I$ from the required current value at time t3 is output to the motor 35, and the control for bringing the required current value toward "0" by the correction value $\Delta I$ is repeated so that the required current value approaches "0". If it is determined at time t4 that the value detected by the opening amount sensor 34 deviates from the target opening amount and indicates that the opening position of the TCV 31 is closer to the first opening position than the position corresponding to the target opening amount is, before the current value reaches "0", it is determined that the actual position of the valve body 33 of the TCV 31 is closer to the first opening position than the position corresponding to the target opening amount is. Accordingly, a new target opening amount is set to a value obtained by correcting the target opening amount by the correction opening amount $\Delta\theta2$ based on the required current value at time t4 so that the opening position of the TCV 31 approaches the second opening position by the correction opening amount $\Delta\theta2$. Because the required current value at time t4 is smaller than the required current value at time t2, the correction opening amount $\Delta\theta2$ is smaller than the correction opening amount $\Delta\theta1$.

Then, the feedback control is repeatedly executed until the value detected by the opening amount sensor becomes equal to the new target opening amount. If it is determined at time t5 that the value detected by the opening amount sensor 34 is equal to the target opening amount, the required current value is adjusted so that the required current value at time t5 is brought toward "0". Because the required current value is smaller than "0" at time t5, an electric current of which the value is equal to a value obtained by adding the correction value $\Delta I$ to the required current value at time t3 is output to the motor 35, and the control for bringing the required current value toward "0" by the correction value $\Delta1$ is repeatedly executed so that the required current value approaches "0". After the process, the required current value exhibits "0" at time 6. Accordingly, it is determined at time t3 that the actual opening amount of the TCV 31 is equal to the third opening amount, and the opening position of the TCV 31 is maintained by the feedback control.

The intake system for an internal combustion engine according to the embodiment of the invention produces the following effects.

1) The TCV 31 according to the embodiment of the invention is formed of the valve body 33 that adjusts the flow passage area in the intake pipe 21 and the valve shaft 32 about which the valve body 33 pivots. Further, the intensity of a swirl flow is adjusted by adjusting the opening amount of the TCV 31, and the opening amount of the TCV 31 is adjusted within the range from the first opening amount to the second opening amount.

The intake pipe 21 is provided with the first rotation restriction portion 23 and the second rotation restriction portion 24. When the opening amount of the TCV 31 is the first opening amount, the first rotation restriction portion 23 prevents the valve body 33 from moving beyond the first opening position by receiving the contact portion 32A of the valve shaft 32. When the opening amount of the TCV 31 is the second opening amount, the second rotation restriction portion 24 prevents the valve body 33 from moving beyond the second opening position by receiving the contact portion 32A. The valve body 33 is divided into the long valve portion 33L and the short valve portion 33S by the valve shaft 32, the length from the valve shaft 32 to the tip of the long valve portion 33L is greater than the length from the valve shaft 32 to the tip of the short valve portion 33S, and the long valve portion 33L is located upstream of the short valve portion 33S. In addition, when the TCV 31 is in the first opening position, one of the valve body 33 and the valve shaft 32 is pushed against the first rotation restriction portion 23 by the intake air flow. When the second rotation restriction portion 24 is in the second opening position, one of the valve body 33 the valve shaft 32 is pushed against the second rotation restriction portion 24 by the intake air flow.

The opening amount that is achieved when one of the valve body 33 and the valve shaft 32 is pushed against the first rotation restriction portion 23 is set as the first opening amount, and the opening amount that is achieved when one of the valve body 33 and the valve shaft 32 is pushed against the second rotation restriction portion 24 by the intake air flow is set as the second opening amount. Therefore, when the valve opening amount is the first opening amount or the second opening amount, the intake air flow is applied in such direction that the first opening amount or the second opening amount is maintained. Accordingly, the opening amount of the valve body 33 of the TCV 31 is maintained at the first opening amount or the second opening amount more stably.

2) According to the embodiment of the invention, when the opening amount of the valve body 33 is the first opening amount, the valve body 33 is maintained in the first opening position with the valve shaft 32 pushed against the first rotation restriction portion 23 by the intake air flowing through the intake pipe 21. When the opening amount of the valve body 33 is the second opening amount, the valve shaft 32 is maintained in the second opening position with the valve shaft 32 pushed against the second rotation restriction portion 24 by the intake air flowing through the intake pipe 21.

When the valve opening amount is the first opening amount or the second opening amount, the first rotation restriction portion 23 or the second rotation restriction portion 24 contacts the contact portion 32A of the valve shaft 32 so as to restrict the rotation of the valve shaft 32. For example, if the rotation of the valve shaft 32 is restricted by pushing the valve body 33 against the wall face of the intake pipe 21, the valve body 33 may be broken. In contrast, the valve shaft 32 is less likely to be broken. Accordingly, it is possible to appropriately restrict the rotation of the valve shaft 32 by bringing the valve shaft 32 into contact with the rotation restriction portion.

3) According to the embodiment of the invention, the TCV 31 is operated using, as the third opening amount, the valve opening amount which is within the valve opening amount range from the first opening amount to the second opening amount and at which the flow passage area in the intake pipe 21 is the maximum value. When there is a command to change the valve opening amount to the third opening amount, the TCV 31 is controlled in such a manner that the valve opening amount is increased. That is, the valve opening amount at which the flow passage area in the intake pipe 21 is the maximum value is set as the third opening amount. Therefore, if the valve opening amount is adjusted to the third opening amount, that is, if the valve body 33 is placed in the third opening position by the control over the TCV 31, the resistance of the TCV 31 against the intake air flowing through the intake pipe 21 is sufficiently reduced.

4) According to the embodiment of the invention, after the contact portion 32A is brought into contact with the first rotation restriction portion 23 according to a command to change the valve opening amount to the first opening amount, a command to maintain the valve opening amount at the first opening amount is no longer transmitted to the TCV 31. The command to maintain the valve body 33 in the first opening position is no longer transmitted to the TCV 31 because the valve body 33 is pushed toward the first wall face 21D of the intake pipe 21 by the intake air, that is, the end portion 32T of the valve shaft 32 is pushed against the first rotation restriction portion 23, when the valve opening amount is the first opening amount. Thus, it is possible to reduce the electric power that is consumed to control the TCV 31.

5) According to the embodiment of the invention, after the contact portion 32A is brought into contact with the second rotation restriction portion 24 according to a command to change the valve opening amount to the second opening amount, a command to maintain the valve opening amount at the second opening amount is no longer transmitted to the TCV 31. The command to maintain the valve body 33 in the second opening position is no longer transmitted to the TCV 31 because the valve body 33 is pushed toward the second wall face 21U of the intake pip 21 by the intake air, that is, the end portion 32T of the valve shaft 32 is pushed against the second rotation restriction portion 24 when the valve opening amount is the second opening amount. Thus, it is possible to reduce the electric power that is consumed to control the TCV 31.

6) The value detected by the opening amount sensor 34 may deviate from the actual opening amount of the valve body 33. Therefore, it is difficult to reliably maintain the actual position of the valve body 33 at the third opening position based only on the value detected by the opening amount sensor 34 in some cases. The third valve opening position is the position of the valve body 33 at which the resistance of the valve body 33 against the intake air is the minimum value. Therefore, it is possible to obtain the required current value for the motor 35, which is required to maintain the actual position of the valve body 33 at the third valve opening position. That is, it is possible to determine whether the actual valve opening amount is the third opening amount based on at least one of the value detected by the opening amount sensor 34 and the required current value for the motor 35.

Therefore, according to the embodiment of the invention, when there is a command to adjust the valve opening amount to the third opening amount, the position of the valve body 33 is adjusted based on the value detected by the opening amount sensor 34 and the required current value for the motor 35. Accordingly, it is possible to more reliably maintain the actual position of the valve body 33 at the third valve opening position.

7) If the actual position of the valve body 33 is offset from the third opening position when the value detected by the opening amount sensor 34 indicates the third opening position, the required current value is changed toward "0". If the force for maintaining the position of the valve body 33, which is produced by the motor 35, falls below the force of the intake air that pushes the valve body 33, the actual position of the valve body 33 changes toward one of the first opening position and the second opening position.

Therefore, according to the embodiment of the invention described above, whether the actual position of the valve body 33 is offset from the third opening position, that is, whether the value detected by the opening amount sensor 34 deviates from the value corresponding to the actual position of the valve body 33 is determined by adjusting the required current value when the value detected by the opening amount sensor 34 indicates the third opening position. Thus, if the value detected by the opening amount sensor 34 deviates from the value corresponding to the actual position of the valve body 33, the actual position of the valve body 33 is adjusted to the third opening position based on the deviation.

8) When the actual position of the valve body 33 is the third opening position, even if the required current value for the motor 35 is set to the minimum current value "0", the actual position of the valve body 33 is maintained at the third opening position, that is, the actual opening amount is maintained at a certain value. Accordingly, in this case, even if the value detected by the opening amount sensor 34 deviates from the value corresponding to the actual position of the valve body 33, the value detected by the opening amount sensor 34 is changed to the certain value based on the actual position of the valve body 33. When the position of the valve body 33 is adjusted based on the value detected by the opening amount sensor 34 and the required current value for the motor 35, the deviation of the value detected by the opening amount sensor 34 from the value corresponding to the actual position of the valve body 33 is reflected in the target opening amount. Therefore, if the value detected by the opening amount sensor 34 is equal to the target opening amount when there is a command to change the position of the valve body 33 to the third opening position, it is estimated that the actual position of the valve body 33 is the third opening position.

According to the embodiment of the invention described above, whether the actual position of the valve body 33 coincides with the third opening position is determined by adjusting the required current value when the value detected by the opening amount sensor 34 exhibits the target opening amount. Therefore, even if the value detected by the opening amount sensor 34 deviates from the actual opening amount, it is possible to confirm that the actual valve opening amount coincides with the third opening amount.

9) When the value detected by the opening amount sensor 34 is equal to the value corresponding to the third opening amount but the actual position of the valve body 33 is offset from the third opening position, if the required current value is changed toward "0", the actual position of the valve body 33 is changed. More specifically, if the force generated by the motor 35 and used to maintain the position of the valve body 33 falls below the force of the intake air that pushes the valve body 33, the actual position of the valve body 33 is changed toward one of the first opening position and the second opening position. If the actual position of the valve body 33 is closer to the first opening position than the third opening position is before adjustment of the required current value is started, the position of the valve body 33 is changed toward the first opening position. On the other hand, if the actual position of the valve body 33 is closer to the second opening position than the third opening position is, the valve opening amount is changed toward the second opening amount.

Therefore, according to the embodiment of the invention, it is determined whether the actual position of the valve body 33 is closer to the first opening position than the third opening position is or closer to the second opening position than the third opening position is based on the value detected by the opening amount sensor 34 that is achieved after the required current value is adjusted. Therefore, it is possible to accurately determine the direction in which the position corresponding to the value detected by the opening amount sensor 34 is offset from the actual position of the valve body 33.

10) If it is determined that the position of the valve body 33 is closer to the first opening position or the second opening position than the third opening position is, the required current value reflects the deviation of the value detected by the opening amount sensor 34 from the value corresponding to the actual position of the valve body 33.

Therefore, according to the embodiment of the invention, the new target opening amount is set to a value that differs from the third opening amount based on the required current value. Accordingly, even if the value detected by the opening amount sensor 34 deviates from the value corresponding to the actual position of the valve body 33, it is possible to change the actual position of the valve body 33 to the third opening position.

11) if the value detected by the opening amount sensor 34 is equal to the target opening amount based on the required current value, it is estimated that the actual position of the valve body 33 is the third opening position.

Therefore, according to the embodiment of the invention, the required current value is changed toward the minimum current value when the value detected by the opening amount sensor 34 is equal to the target opening amount. Then, it is determined that the actual valve opening amount is equal to the third opening amount if the value detected by the opening amount sensor 34 is equal to the target opening amount. Thus, it is possible to more reliably determine that the actual valve opening amount is equal to the third opening amount.

12) According to the embodiment of the invention, it is possible to adjust the actual position of the valve body 33 to the third opening position. Therefore, after the actual position of the valve body 33 is adjusted to the third opening position, it is possible to reliably suppress consumption of the electric power required to maintain the position of the valve body 33 at the third opening position.

The invention is not limited to the embodiment described above. The invention may be implemented in the following embodiments.

In the embodiment of the invention described above, rotation of the valve shaft 32 is restricted and the first opening amount or the second opening amount is achieved by causing the contact portion 32A of the valve shaft 32 to contact the first rotation restriction portion 23 or the second rotation restriction portion 24. Alternatively, rotation of the valve shaft 32 may be restricted and the first opening amount or the second opening amount may be achieved by causing the long valve portion 33L of the valve body 33 to contact the first wall face 21D or the second wall face 21U. In this case as well, it is possible to produce the above described effects 1) and 3) to 12) in the above-described embodiment. In addition, the first wall face 21D or the second wall face 21U, which are included in the inner wall of the intake pipe 21, is used as the rotation restriction portion. Accordingly, design change from the existing intake pipe is smaller than that when the contact portion 32A of the valve shaft 32 is caused to contact the first rotation restriction portion 23 or the second rotation restriction portion 24.

In this case, a housing portion in which the tip of the long valve portion 33L is housed or a fixed portion to which the tip of the long valve portion 33L is fixed may be formed in the wall of the intake pipe 21. In this way, the valve body 33 is maintained in the second opening position or the first opening position more reliably.

In this case, the intake air flows through only the second short valve side passage B when the valve body 33 is in the second opening position, and the intake air flows through only the first short valve side passage A when the valve body 33 is in the first opening position. Alternatively, part of the upper region 22U may be opened when the valve body 33 is in the second opening position, and part of the lower region 22D may be opened when the valve body 33 is in the first opening position. That is, the outer peripheral shape of the valve body 33 or the inner peripheral shape of the intake pipe 21 is may be set in such a manner that a clearance is formed between the outer periphery of the long valve portion of the TCV and the wall of the intake pipe when the long valve portion 33L contacts the first wall face 21D or the second wall face 2M, or a hole, through which the intake air flows, may be formed in the valve body 33.

In the embodiment of the invention described above, the size of the long valve portion 33L is set in such a manner that when the TCV 31 is driven by rotation of the valve shaft 32, the tip of the long valve portion 33L reaches its closest point to the wall of the intake pipe 21 in the upper region 22U or the lower region 22D with a slight clearance left therebetween. Alternatively, the tip of the long valve portion 33L may contact the wall of the intake pipe 21. In this case as well, it is possible to produce at least the above-described effects 1) and 3) to 12) in the above-described embodiment.

In the embodiment of the invention described above, the contact portion 32A of the valve shaft 32 is formed so as to project from the outer periphery of the end portion 32T, and the first rotation restriction portion 23 and the second rotation restriction portion 24 are arranged on a circle that is coaxial with the valve shaft 32. However, the shapes of the contact portion and each rotation restriction portion are not limited to the ones in the embodiment of the invention. The contact portion, the first rotation restriction portion and the second rotation restriction portion may have any shapes as long as the rotational angle of the valve body is restricted by contact of the contact portion with the first rotation restriction portion or the second rotation restriction portion.

In the embodiment of the invention described above, it is determined that the position of the valve body 33 is the third opening position if the required current value is equal to the minimum current value "0" in the "process of adjusting the opening amount when the TCV is required to be in the third opening position". However, another criterion may be used. For example, the minimum current value used for determination may be set to a predetermined value other than "0" based on the actual state. Alternatively, the minimum current value may be a predetermined range of values instead of a specific value.

In the embodiment of the invention described above, it is determined that the position of the valve body 33 is the third opening position if the required current value is equal to "0" in the "process of adjusting the opening amount when the TCV is required to be in the third opening position". Alternatively, it may be determined whether the valve body 33 is in the third opening position based on an index other than the required current value. For example, if the PWM control is used as the control over the motor 35, the duty ratio of 50% may be used as the index.

In the embodiment of the invention described above, it is determined whether the actual position of the valve body 33 is the third opening position based on the required current value for driving the motor 35. Alternatively, a sensor that directly detects the current value output to the motor may be provided and the value detected by the sensor may be used.

In the embodiment of the invention described above, the valve shaft 32 extends perpendicularly to the center line CI of the intake pipe 21. However, arrangement of the valve shaft 32 is not limited to this. The valve shaft 32 may extends in a direction that is not parallel to the center line CI, that is, the valve shaft 32 may be inclined with respect to the center line CI.

In the embodiment of the invention described above, the valve shaft 32 is arranged in the upper region 22U of the intake pipe 21. Alternatively, the valve shaft 32 may be arranged in the lower region 22D. The entirety of the valve shaft 32 is located within the upper region 22U in the reference cross section. Alternatively, part of the valve shaft 32 may be located in the lower region 22D.

In the embodiment of the invention described above, the valve body axis CV of the valve body 33 is parallel to the center line CI of the intake pipe 21 when the valve body 33 is in the third opening position. However, arrangement of the valve body 33 is not limited to this. That is, the valve body 33 may be arranged in such a manner that the valve body axis CV is not parallel to the center line CI when the valve body 33 is in the third opening position.

The valve body to which the invention is applied is not limited to the valve body of the intake system for an internal combustion engine described in the embodiment of the invention. That is, the invention may be applicable to any valve bodies which are used to change the flow passage area, of which the opening amount may be set in multiple degrees, and which are fully open when the valve bodies are parallel to the flow direction.

While the invention has been described with reference to the example embodiment thereof, it is to be understood that the invention is not limited to the example embodiment or constructions. To the contrary, the invention is intended to cover various modifications and equivalent arrangements. In addition, while the various elements of the example embodiment are shown in various combinations and configurations, which are exemplary, other combinations and configurations, including more, less or only a single element, are also within the scope of the invention.

What is claimed is:

1. An intake system for an internal combustion engine, comprising:
   an intake air flow control valve that is formed of a valve body that adjusts a flow passage area in an intake pipe and a valve shaft about which the valve body pivots;
   a control unit that adjusts a valve opening amount, which is an opening amount of the intake air flow control valve, to adjust an intensity of a swirl flow, and that adjusts the valve opening amount within a valve opening amount range from a first opening amount to a second opening amount;
   a first rotation restriction portion that contacts the intake air flow control valve when the valve opening amount is the first opening amount to prevent the valve body from moving beyond a first opening position at which the valve opening amount is the first opening amount; and
   a second rotation restriction portion that contacts the intake air flow control valve when the valve opening amount is the second opening amount to prevent the valve body from moving beyond a second opening position at which the valve opening amount is the second opening amount, wherein
   the valve body is divided into a long valve portion and a short valve portion by the valve shaft, a length from the valve shaft to a tip of the long valve portion is greater than a length from the valve shaft to a tip of the short valve portion, and the long valve portion is located upstream of the short valve portion;
   when the valve opening amount is the first opening amount, the intake air flow control valve is pushed against the first rotation restriction portion by an intake air flowing through the intake pipe; and
   when the valve opening amount is the second opening amount, the intake air flow control valve is pushed against the second rotation restriction portion by the intake air flowing through the intake pipe.

2. The intake system according to claim 1, wherein:
   when the valve opening amount is the first opening amount, the first rotation restriction portion contacts the valve shaft to restrict rotation of the valve shaft;
   when the valve opening amount is the second opening amount, the second rotation restriction portion contacts the valve shaft to restrict the rotation of the valve shaft;
   when the valve opening amount is the first opening amount, the valve body is maintained in the first opening position with the valve shaft pushed against the first rotation restriction portion by the intake air flowing through the intake pipe; and
   when the valve opening amount is the second opening amount, the valve body is maintained in the second opening position with the valve shaft pushed against the second rotation restriction portion by the intake air flowing through the intake pipe.

3. The intake system according to claim 2, wherein:
   the control unit operates the valve body using, as the first opening amount, a valve opening amount that is achieved when the tip of the long valve portion is positioned near a first wall face that is a part of a wall face of the intake pipe, and using, as the second opening amount, a valve opening amount that is achieved when the tip of the long valve portion is positioned near a second wall face that is a part of the wall face of the intake pipe and that is opposed to the first wall face;
   when there is a command to change the valve opening amount to the first opening amount, the control unit operates the intake air flow control valve until the valve shaft contacts the first rotation restriction portion; and
   when there is a command to change the valve opening amount to the second opening amount, the control unit operates the intake air flow control valve until the valve shaft contacts the second rotation restriction portion.

4. The intake system according to claim 1, wherein:
   the first rotation restriction, portion is a first wall face that is a part of a wall face of the intake pipe and that corresponds to the tip of the long valve portion;
   the second rotation restriction portion is a second wall face that is a part of the wall face of the intake pipe and that is opposed to the first wall face;
   when the valve opening amount is the first opening amount, the valve body is maintained in the first opening position while being pushed against the first wall face by the intake air flowing through the intake pipe; and
   when the valve opening amount is the second opening amount, the valve body is maintained in the second opening position while being pushed against the second wall face by the intake air flowing through the intake pipe.

5. The intake system according to claim 4, wherein:
   the control unit operates the valve body using, as the first opening amount, a valve opening amount that is achieved when the tip of the long valve portion contacts the first wall face that is a part of the wall face of the intake pipe, and using, as the second opening amount, a valve opening amount that is achieved when the tip of the long valve portion contacts the second wall face that is a part of the wall face of the intake pipe and that is opposed to the first wall face;

when there is a command to change the valve opening amount to the first opening amount, the control unit operates the intake air flow control valve until the tip of the long valve portion contacts the first wall face; and when there is a command to change the valve opening amount to the second opening amount, the control unit operates the intake air flow control valve until the tip of the long valve portion contacts the second wall face.

6. The intake system according to claim 1, wherein:
the control unit operates the intake air flow control valve using, as a third opening amount, a valve opening amount which is within the valve opening amount range from the first opening amount to the second opening amount and at which the flow passage area in the intake pipe is a maximum value; and when there is a command to change the valve opening amount to the third opening amount, the control unit operates the intake air flow control valve in such a direction that the valve opening amount is increased.

7. The intake system according to claim 1, wherein after one of the valve body and the valve shaft is brought into contact with the first rotation restriction portion according to a command to change the valve opening amount to the first opening amount, the control unit does not transmit a command to maintain the valve opening amount at the first opening amount to the intake air flow control valve.

8. The intake system according to claim 1, wherein after one of the valve body and the valve shaft is brought into contact with the second rotation restriction portion according to a command to change the valve opening amount to the second opening amount, the control unit does not transmit a command to maintain the valve opening amount at the second opening amount to the intake air flow control valve.

9. The intake system according to claim 1, wherein:
a cross section of the intake pipe that includes a center line of the intake pipe that extends in a direction of an air flow and that is parallel to a center line of a cylinder is used as a reference cross section;

the reference cross section is divided into two regions by the center line of the intake pipe;

one of the two regions that is communicated at a downstream portion with a center portion of a combustion chamber is an upper region, the other of the two regions that is communicated at a downstream portion with a perimeter portion of the combustion chamber is a lower region; and an axis of the valve shaft is set to a position that is offset from the center line of the intake pipe in the reference cross section and that is in one of the upper region and the lower region.

10. The intake system according to claim 9, wherein an entirety of the valve shaft in a projection view that is obtained when being projected into the reference cross section in an axial direction of the valve shaft belongs to one of the upper region and the lower region.

11. The intake system according to claim 9, wherein the axis of the valve shaft is perpendicular to the reference cross section.

12. The intake system according to claim 1, wherein:
when the valve opening amount is the first opening amount, a first short valve side passage is formed between the tip of the short valve portion and a wall face of the intake pipe as a part of an intake passage and an intake air flow between the tip of the long valve portion and the wall of the intake pipe is blocked;

when the valve opening amount is the second opening amount, a second short valve side passage is formed between the tip of the short valve portion and the wall face of the intake pipe as a part of the intake passage and an intake air flow between the tip of the long valve portion and the wall of the intake pipe is blocked; and a flow passage area of the first short valve side passage is maintained smaller than a flow passage area of the second short valve side passage, whereby an intensity of a swirl flow that is produced in a combustion chamber when the valve opening amount is the first opening amount is maintained higher than an intensity of a swirl flow that is produced in the combustion chamber when the valve opening amount is the second opening amount.

13. The intake system according to claim 12, further comprising:
an opening amount detector that detects the valve opening amount; and a current detector that detects a supply current value which is a value of an electric current that is supplied to an actuator for the intake air flow control valve, wherein the control unit operates the valve body using, as a third opening amount, an opening amount at which the flow passage area in the intake pipe is a maximum value and a resistance of the valve body against the intake air is a minimum value; and when there is a command to change the valve opening amount to the third opening amount, the control unit controls the valve opening amount based on the valve opening amount detected by the opening amount detector and the current value detected by the current detector.

14. The intake system according to claim 13, wherein:
the control unit uses, as a minimum current value, a current value at which an actual valve opening amount is maintained at the third opening amount even if a force for maintaining the valve opening amount is decreased when the actual valve opening amount is the third opening amount;

the control unit adjusts the supply current value toward the minimum current value when the valve opening amount detected by the valve opening amount detector is the third opening amount; and if the valve opening amount detected by the opening amount detector deviates from the third opening amount due to the adjustment of the supply current value, the control unit determines that the actual valve opening amount is not maintained at the third opening amount.

15. The intake system according to claim 13, wherein:
the control unit uses, as a minimum current value, a current value at which an actual valve opening amount is maintained at the third opening amount even if a force for maintaining the valve opening amount is decreased when the actual valve opening amount is the third opening amount;

the control unit adjusts the supply current value toward the minimum current value if the valve opening amount detected by the valve opening amount detector is a target valve opening amount when there is a command to change the valve opening amount to the third opening amount; and if the valve opening amount detected by the opening amount detector is still maintained at the target valve opening amount when the supply current value reaches the minimum current value due to the adjustment of the supply current value, the control unit determines that the actual valve opening amount is maintained at the third opening amount.

16. The intake system according to claim 14, wherein:

if the valve opening amount detected by the opening amount detector is changed toward the first opening amount due to the adjustment of the supply current value toward the minimum current value, the control unit determines that the actual valve opening amount indicates a position that is closer to the first opening position than the third opening position is; and if the valve opening amount detected by the opening amount detector is changed toward the second opening amount due to the adjustment of the supply current value toward the minimum current value, the control unit determines that the actual valve opening amount indicates a position that is closer to the second opening position than the third opening position is.

17. The intake system according to claim 16, wherein:

if the control unit determines that the actual valve opening amount indicates the position that is closer to the first opening position than the third opening position is, the control unit sets a target valve opening amount to a value other than the third opening amount based on a difference between the supply current value detected by the current detector and the minimum current value, and then adjusts the supply current value in such a manner that the valve opening amount detected by the opening amount detector becomes equal to the target valve opening amount; and if the control unit determines that the actual valve opening amount indicates the position that is closer to the second opening position than the third opening position is, the control unit sets the target valve opening amount to a value other than the third opening amount based on the difference between the supply current value detected by the current detector and the minimum current value, and then adjusts the supply current value in such a manner that the valve opening amount detected by the opening amount detector becomes equal to the target valve opening amount.

18. The intake system according to claim 17, wherein:

if the valve opening amount detected by the opening amount detector reaches the target valve opening amount due to the adjustment of the supply current value, the control unit adjusts the supply current value toward the minimum current value; and if the valve opening amount detected by the opening amount detector is still equal to the target valve opening amount when the supply current value reaches the minimum current value due to the adjustment of the supply current value, the control unit determines that the actual valve opening amount is maintained at the third opening amount.

19. The intake system according to claim 17, wherein:

if the valve opening amount detected by the opening amount detector deviates from the target valve opening amount due to the adjustment of the supply current value toward the minimum current value, the control unit determines that the actual valve opening amount is not maintained at the third opening amount, and executes again a series of processes that includes a process of setting the target valve opening amount based on the difference between the supply current value and the minimum current value, a process of adjusting the supply current value to bring the valve opening amount detected by the opening amount detector to the target valve opening amount, a process of adjusting the supply current value toward the minimum current value when the valve opening amount detected by the opening amount detector is the target valve opening amount, and a process of determining a relationship between the actual valve opening amount and the third opening amount based on a manner in which the valve opening amount detected by the opening amount detector is changed due to the adjustment of the supply current value.

\* \* \* \* \*

UNITED STATES PATENT AND TRADEMARK OFFICE
CERTIFICATE OF CORRECTION

PATENT NO. : 8,245,688 B2
APPLICATION NO. : 12/635778
DATED : August 21, 2012
INVENTOR(S) : Toshiaki Uda It is certified that error appears in the above-identified patent and that said Letters Patent is hereby corrected as shown below:

Col. 9, line 6: replace "clue to" with --due to--;

Col. 10, line 37: replace "335" with --33S--;

Col. 13, line 18: replace "335" with --33S--;

Col. 22, line 18: replace "2M" with --21U--.

Signed and Sealed this
Nineteenth Day of March, 2013

Teresa Stanek Rea
*Acting Director of the United States Patent and Trademark Office*